United States Patent [19]
Roth et al.

[11] Patent Number: 5,967,101
[45] Date of Patent: Oct. 19, 1999

[54] ENGINE COOLING SYSTEM AND THERMOSTAT WITH IMPROVED BYPASS CONTROL

[75] Inventors: David B. Roth, W. Bloomfield; Larry S. Rogosin, Farmington Hills, both of Mich.

[73] Assignee: Chrysler Corporation, Auburn Hills, Mich.

[21] Appl. No.: 09/071,245

[22] Filed: May 1, 1998

[51] Int. Cl.⁶ .................................................. F01P 3/00
[52] U.S. Cl. .................. 123/41.29; 123/41.1; 236/92 R; 236/101 C
[58] Field of Search ............... 123/41.08, 41.09, 123/41.1, 41.29; 236/34, 34.5, 92 R, 92 C, DIG. 16, 101 C

[56] References Cited

U.S. PATENT DOCUMENTS

| | | | |
|---|---|---|---|
| 2,500,472 | 3/1950 | Sohler | 123/41.1 |
| 3,353,745 | 11/1967 | Beatenbough | 236/34 |
| 3,805,748 | 4/1974 | Garcea et al. | 123/41.1 |
| 3,851,629 | 12/1974 | Mayr et al. | |
| 4,344,564 | 8/1982 | Magnuson | |
| 4,456,167 | 6/1984 | Buter | |
| 4,748,941 | 6/1988 | Kashiwase | |
| 4,883,225 | 11/1989 | Kitchens | |
| 4,938,185 | 7/1990 | Doke | |
| 5,111,776 | 5/1992 | Matsushiro et al. | |
| 5,174,254 | 12/1992 | Humburg | |

Primary Examiner—Noah P. Kamen
Attorney, Agent, or Firm—Kenneth H. Maclean

[57] ABSTRACT

This liquid cooling system for internal combustion engines employs a double acting thermostat to prevent coolant temperature fluctuation over a large range of engine loads and speeds and to selectively block coolant flow through the bypass circuit so that the heater and defrost circuit at engine start up and idle will have optimal flow from the coolant pump through the engine for quick heat and defrost purposes. With increased engine speed for vehicle operation, the pump increases coolant flow and pressure, causing the thermostat to open the bypass circuit in parallel with the heater core circuit. This increases flow capacity of the system and eliminate pump cavitation to enhance pump efficiency and system service life. At predetermined higher coolant temperatures, a pellet in the thermostat expands to effect thermostat opening of the high capacity radiator circuit of the system and closing the bypass circuit so that efficiency is further increased and excessive heat energy is effectively dissipated from the coolant.

5 Claims, 3 Drawing Sheets

ENGINE COOLING SYSTEM AND THERMOSTAT WITH IMPROVED BYPASS CONTROL

BACKGROUND OF THE INVENTION

1. Field of the Invention

This invention relates to cooling systems for internal combustion engines, and more particularly, to a cooling circuit featuring a new and improved thermostat with double acting control valving that provides control over the heater, bypass and radiator circuits of the cooling system tailored to match pump outputs. The thermostat closes the bypass circuit for quick warm up and defrost operation and subsequently opens this circuit at moderate engine speed for cavitation control. Under high temperature conditions, the radiator circuit is opened and the bypass circuit is again closed for improved efficiency and dissipation of excessive heat energy from the engine.

2. Description of Related Art

Prior to the present invention various engine cooling circuits have been designed with pellet-type, engine-mounted thermostats providing automatic coolant flow valving that opens and closes at predetermined engine coolant pressures and temperatures to improve engine cooling performance and provide cab warm up. For example, U.S. Pat. No. 4,883,225 issued Nov. 28, 1989 to J. Kitchens for "Fail Safe Thermostat for Vehicular Cooling System" employs a double acting pellet type thermostat in a liquid cooling system for the internal combustion engine of a vehicle to provide shunt flow to a heater core and around the radiator for rapid warm up of the engine when starting. U.S. Pat. No. 4,748,941 issued Jun. 7, 1988 to H. Kashiwase for "Cooling System For An Engine" discloses a double acting thermostat in another engine cooling system that closes off the radiator circuit in a cold engine state to enhance the coolant flow to the heater providing improved warm up.

While these prior systems provide various thermostat and engine cooling circuit arrangements to improve engine coolant flows and cab heating performance, they do not provide thermostat control of the various circuits so that pump output is effectively and efficiently matched to the different circuits of the system for optimized flow as in the present invention. More particularly the prior systems do not meet the new and higher standards for bypass circuit closure for faster warm up and defrost particularly during engine idle as provided by the present invention.

SUMMARY OF THE INVENTION

This invention is drawn to a new and improved cooling system for an internal combustion engine of an automotive vehicle comprising radiator, heater core and heater core bypass circuits. The system includes a double acting thermostat associated with the engine to prevent the fluctuation of coolant temperature over a large range of engine loads and speeds. The thermostat incorporates a new and improved bypass control valve, which closes the bypass circuit on start up and idle of a cold engine so that there is optimized coolant flow from the engine to the cab heater for quick warm up and defrost operation. Subsequently, the bypass control valve opens to redirect a portion of the flow of coolant through the radiator bypass circuit when specific temperatures and pressures are reached after idle and warm up to increase circuit capacity and prevent pump cavitation. At higher coolant temperatures, the thermostat operates to open the radiator circuit and positively close the bypass circuit for more effective engine heat management.

More particularly, the bypass control valve of the thermostat is lightly spring loaded to releasably close the internal bypass circuit. This low rate spring (1- 5 lbs. force) will be overcome at moderate engine speed thereby opening and preserving the function of the internal bypass circuit so that it prevents pump cavitation and improves engine thermal management of engine heat energy at intermediate speeds and after warm up. Subsequently, in the thermostat open position for radiator operation, the thermostat pellet displaces a spring support plate on the thermostat shaft to positively hold the bypass valve in a bypass closed position. With the bypass closed and the main valve of the thermostat displaced to the open position, the radiator of the system effectively manages excessive heat energy.

This invention provides for the optimized matching of a low horsepower pump to the coolant system of an internal combustion engine in an automotive vehicle and improves the heater core coolant flow from the engine particularly under cold start and idle conditions which provides as much as 33% improvement in the heading of the vehicle interior in some installations.

This invention further provides a double acting thermostat for controlling the flow of liquid coolant through; a heater circuit, a bypass circuit with a flow controlling valve seat therein, and a radiator circuit of a cooling system for an internal combustion engine of an automotive vehicle. The thermostat includes a first valve element, a first valve seat for the first valve element defining a control passage for controlling the flow of coolant through the radiator circuit. Movement of the valve element is by a heat responsive expansible and contractible pellet or other medium operatively mounted in the thermostat for moving said first valve element from the valve seat to open the control passage to enable the liquid coolant to flow therethrough and the associated radiator circuit when normal hot engine temperature is attained. A plurality of discrete springs preloaded and mounted in series provide a spring force opposing movement of the first valve element from the first valve seat. A second valve element associated with the valve seat controlling flow through the bypass circuit, the second valve element being movable between open and closed positions with respect to the valve seat in the bypass circuit to control the flow of coolant through the bypass circuit. A light spring having a rate less than the rates of said first springs is directly associated with the second valve element and is compressable in one condition of operation to allow said second valve element to move from said bypass seat in bypass circuit to open by the force of coolant in said bypass circuit to allow flow of coolant through the bypass circuit when the radiator circuit is closed and also being compressable in another condition of operation to hold the second valve element tightly onto the bypass valve seat to thereby close the bypass circuit in response to the opening of the radiator circuit when the heat responsive medium has expanded.

Another feature, object and advantage of this invention to provide a new and improved coolant system in automotive vehicle for quick cab heat up for passenger comfort and for window defrost purposes. This is accomplished by closing off the bypass circuit so that the flow through the heater core is optimized. This is particularly important because prior cooling systems, even with high horsepower pumps, with double acting thermostats and bypass circuits generally have marginal heater core flow at idle.

Another feature, object and advantage of this invention is to provide a new and improved liquid cooling system for internal combustion engine in vehicles featuring a double acting thermostat for selective bypass coolant circuit closure by low rate spring valving for improved heater core flow and pump performance at engine idle with improved heat up for defrost and cab heating.

BRIEF DESCRIPTION OF THE DRAWINGS

These and other features objects and advantages of the invention will become more apparent from the following detail description and drawings in which.

DESCRIPTION OF THE PREFERRED EMBODIMENTS

Figure 1:
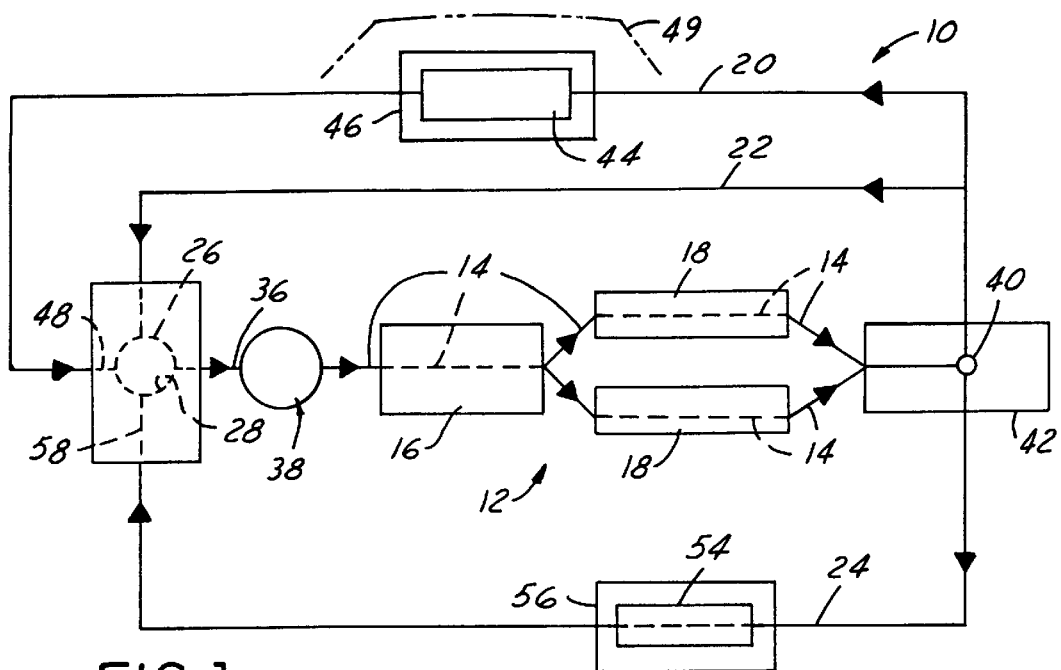
FIG. 1 is a schematic diagram of the cooling system of one preferred embodiment of the invention.
Figure 2:
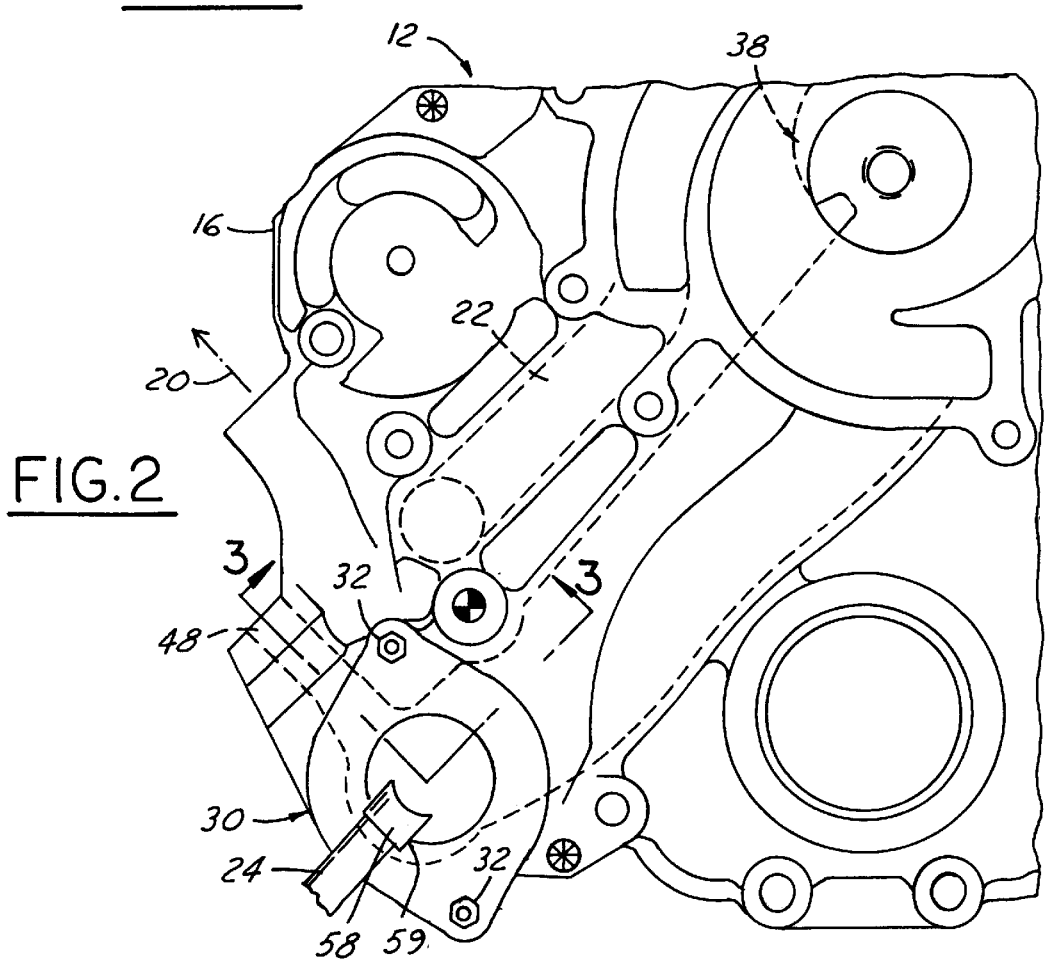
FIG. 2 is an end view of a portion of an internal combustion engine illustrating aspects of this invention.

Turning now in detail to the drawings, FIG. 1 diagrammatically depicts the coolant system 10 of an internal combustion engine 12 of an automotive vehicle. The cooling system includes engine cooling passages 14 (providing the water jacket) that extends throughout the engine block 16 and heads 18. The cooling system additionally includes the heater core circuit 20, a heater core bypass circuit 22, and the radiator circuit 24.

Coolant flow through the circuits of the system is controlled by a double acting thermostat 26 operatively mounted in a coolant flow control junction 28 formed in the engine block 16 where the different circuits 20, 22, 24 merge. The thermostat 26 is operatively secured in the flow control junction by thermostat housing 30 that is in turn secured by screws 32 to a mounting pad 34 fastened to or formed on the engine block 16. A fluid passage 36 hydraulically connects the thermostat controlled junction 26 to an engine driven rotary hydraulic pump 38 that pumps the liquid coolant through the system.

More particularly, the pump 38 is a low horsepower pump (2 ⅓ hp for example) to minimize power demand from the engine so that more power is available for vehicle propulsion. The pump 38 pumps the liquid coolant through the engine block 16 and the heads 18 thereof. Coolant exits the engine through a junction 40 in the engine block, which is housed by front cover 42. The heater circuit 20 leads from the junction 40 through the core 44 of the heater 46 and back to a heater core passage 48 in the engine block feeding into flow control junction 28 through the thermostat 26 and mounting pad. The heater is operatively mounted within the vehicle cab 49 for conventional heating and window defrosts.

In addition to the heater core circuit 20, the coolant system includes the heater core bypass circuit 22 that is connected in parallel with respect to the heater core circuit. As shown, the bypass circuit hydraulically connects into the heater core circuit upstream of the heater and feeds into junction 28 of the engine block.

The radiator circuit 24 of the engine coolant system leads from the junction 40 through the core 54 of a radiator 56 and into a coolant inlet fitting 58 extending -into a cooling intake opening 59 provided in the thermostat housing 30. This housing provides an upper chamber 60 that, in a thermostat open position, connects into junction 28.

Figure 3:
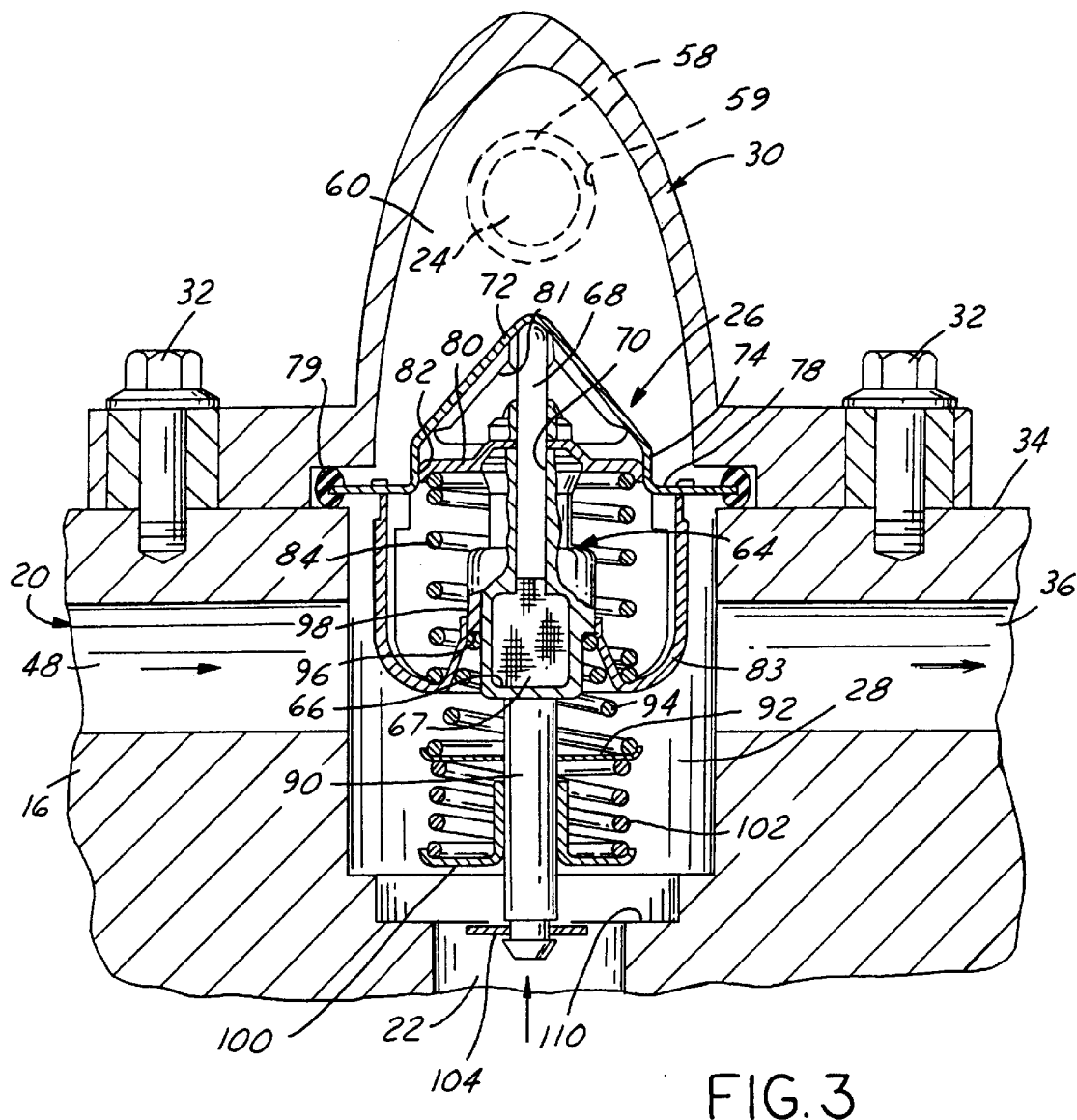
FIG. 3 is a cross section view taken generally along sight lines 3—3 of FIG. 2.
Figure 3A:
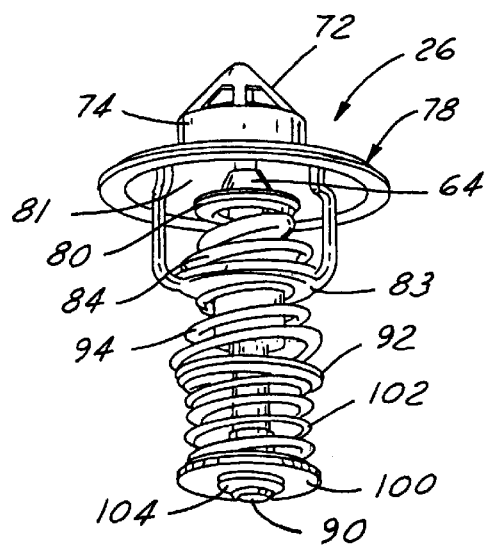
FIG. 3A is a pictorial view of the thermostat of FIG. 3.
Figure 4:
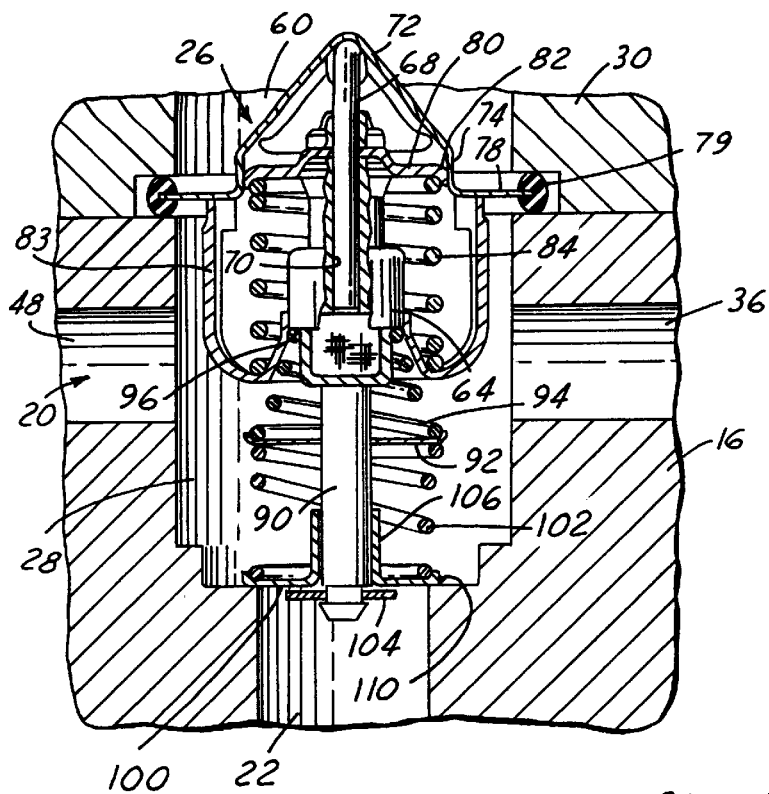
FIG. 4 is a view similar to the view of FIG. 3 illustrating thermostat control of the circuits of the system of this invention under cold engine idle conditions.
Figure 5:
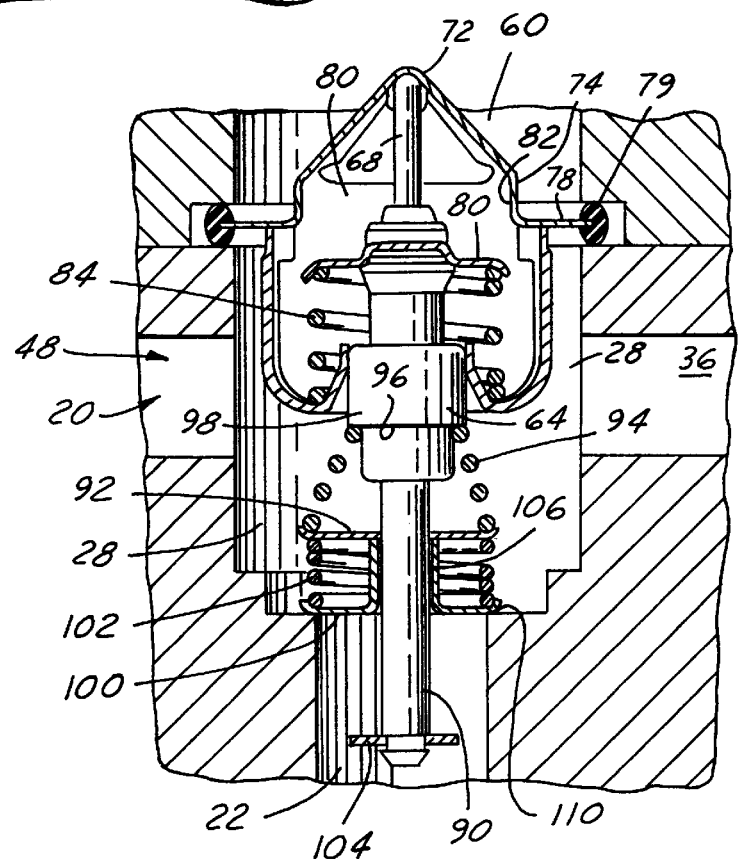
FIG. 5 is another view similar to the view of FIG. 4 illustrating another operation of the thermostat controlling the circuits of this invention.

FIGS. 3, 4 and 5 disclose details of a preferred construction of the thermostat 26 as operatively mounted in the flow control junction 28 in the engine block 16 and secured therein by housing 30.

The thermostat 26 has a centralized and elongated inner body 64 with a chamber 66 formed therein. This chamber houses a thermostatic medium such as pellet 67 that expands and contracts in accordance with changes in the temperature of the liquid coolant. For example at 225° F., the pellet expands to effect closure of the bypass circuit 22 as show in FIG. 5.

Extending upward from chamber 66 is a cylindrical rod member 68 slidably mounted in a cylindrical passage 70 in the inner body 64. The distal or outboard end of rod 68 connects to the apex of a triangular shaped top strap member 72 of the thermostat. The top strap member 72 extends from opposing connection points of an inwardly opened annular collar 74 of a disk-like sealing ring 78 adapted to be mounted in a fluid tight manner into the flow control junction 28 by the housing 30.

More particularly, the periphery of the sealing ring 78 carries an annular elastomer seal 79 that fits in a counter bore and is deflected under the load of the housing 30 when the screws 32 are tightened down to effect fluid tight sealing between the housing and the flow control junction 28. The upstanding collar 74 defines an inner flow passage 81 and passage 82 connecting the chamber 60 to the flow junction 28 when the thermostat assembly is opened.

An annular, disk-like valve member 80, centrally fixed to the upper end of the inner body 64, is normally urged into coolant sealing contact with an annular valve seat 82 provided on the interior wall of annular collar 74 by a preloaded helical spring 84. The spring, which may be rated at 25–30 lbs., is operatively mounted around the inner body 64 and is supported by a U-shaped carrier strap 83 to provide the upwardly directed force to urge the valve element 80 into a coolant sealing position with respect to the collar 74 and valve seat 82 whereby the chamber 60 and radiator circuit 24 is blocked.

The spring 84 is overcome on predetermined expansion of the pellet 67 by the heat energy of the coolant causing the inner body 64 to move downwardly along with the valve member 80 away from its seat 82 to thereby open the chamber 60 and radiator circuit 24 via passage 81 to junction 28 and the intake passage 36 leading into the pump 38.

In addition to the radiator circuit control valve 80, the thermostat has special bypass control valving that enables the employment of a low horsepower pump such as pump 38 to be effectively employed in the cooling system 10.

As best shown in FIGS. 3 through 5, the thermostat 26 has a centralized downwardly extending rod 90 that is securely connected to the inner body 64 of the thermostat and extends downwardly therefrom. The fixed rod 90 has an annular spring support plate 92 slidably mounted thereon on which a high rate or "heavy" conical spring 94 is seated. From the support plate 92 the spring extends into contact with an annular shoulder 96 on a cylindrical portion 98 of the inner body 64 of the thermostat. The spring 84 provides the spring force required to maintain the inner body 64 in the operative position of FIGS. 3 and 4 and to yieldably oppose opening movement of the valve 80 downwardly when the thermostat is operating to open the radiator circuit as in FIG. 5.

In addition to supporting the spring plate 92 and the heavy spring 94, the rod 90 slidably supports an annular bypass control valve 100 and an associated light or low rate helical spring 102. The light spring 102 is operatively mounted between the bypass control valve 100 and the spring support plate 92. The bypass valve 100 is retained from movement off the end of the rod 90 by a circlip 104 or other suitable retainer installed in the annular groove in the distal end of the fixed rod 90. The bypass control valve 100 has a centralized cylindrical and upwardly extending collar 106 that is engaged by the heavy spring support plate 92 when the thermostat body is moved downward against the force of the serially arranged springs in response to pellet expansion to effect closure of the bypass circuit 22 as shown in FIG. 5. When in this position, the valve 100 is seated in a fluid tight manner on its seat 110 in the junction 28. The light spring is preferably fully deflected (solid) in this condition.

FIG. 4 illustrates an intermediate operation of bypass valve operation. In cold weather and at idle or low engine speed when optimized heater flow is required for cab heating and defrost operation, the light spring 102 is effective to move valve 100 into fluid sealing engagement with the valve seat 110 to close off the internal bypass circuit thus providing maximized coolant flow through the heater core circuit 20. This low-speed, cold engine operation is illustrated in FIG. 4 in which the valve member 80 controlling radiator flow and valve 100 controlling bypass flow are both closed. Under these conditions, the flow of coolant pumped by pump 38 is only through the block and heads of the engine 12 and through the heater core circuit. Importantly, since there is no wasted flow through the bypass path 22 or through the radiator circuit 24, a smaller more economical pump can be employed in the system. In addition, improved cab heating and defrost are provided.

As best illustrated in FIG. 3, the force of the light spring 102 will be overcome and the valve deflected upwards from its seat at moderate engine speeds in response to progressively increasing pressure from the output of the engine driven pump. With the valve 100 opened, the function of the internal bypass circuit is maintained to sharply reduce or prevent pump cavitation as coolant is being pumped by pump 38. With minimized cavitation, the efficiency of the system is maintained and there is no pitting of erosion of the components of the system as might otherwise occur.

When the coolant becomes sufficiently heated by the heat energy of the engine, the thermostat moves to the open position of FIG. 5. As illustrated in this Figure, the thermostat pellet 66 has expanded causing the thermostat body 64 to move downwardly. This action moves the valve member 80 off of valve seat 82 to open passage 81 and the radiator circuit 24 whereby flow from the radiator passes through the thermostat and enters the pump intake passage 36 so that the pump 38 pumps coolant only through the heater core and radiator circuits 24 and 20. The bypass circuit 22 is closed at this time because the heavy spring plate 92 on the rod 90 engages the upstanding collar 106 on the bypass valve 100 to cause it to sealingly engage the bypass valve seat 110. The light spring is preferably fully deflected at this time. With the thermostat open, the pump 38 has sufficient capacity to handle the flow requirements of circuits 20 and 24 at any engine speed.

The present invention, more precisely matches the circuits of the system to the output of a low horsepower pump whose output varies with engine speeds. With the use of such a pump, accessory demand on the vehicle engine is reduced so that engine efficiency is increased and more horsepower is available for vehicle propulsion.

While a preferred embodiment of the invention has been shown and described, other embodiments will now become apparent to those skilled in the art. Accordingly, this invention is not to be limited to that which is shown and described but by the following claims.

What is claimed is:

1. A double acting thermostat for controlling the flow of liquid coolant through a heater circuit, a bypass circuit with a flow controlling bypass valve seat therein and a radiator circuit of a cooling system for an internal combustion engine of an automotive vehicle, comprising a first valve element, a first valve seat for said first valve element defining a control passage for controlling the flow of coolant through the radiator circuit, a heat responsive expansible and contractible medium operatively mounted in said thermostat for moving said first valve element from said valve seat to open said control passage to enable the liquid coolant to flow therethrough and the associated radiator circuit, a plurality of discrete springs providing a spring force opposing movement of said first valve element from said first valve seat, a second valve element, a second valve element associated with the bypass valve seat, said second valve element being movable between open and closed positions with respect to the bypass valve seat to control the flow of liquid coolant through the bypass circuit, an additional spring directly associated with the second valve element and being deflectable in one condition of operation in which said second valve element is moved from said bypass valve seat from the force of coolant in said bypass circuit to open said bypass circuit when the radiator circuit is closed and also being deflected in another condition of operation to hold said second valve element tightly onto the bypass valve seat to thereby close said bypass circuit in response to the opening of the radiator circuit when said medium has expanded.

2. A double-acting thermostat for controlling the coolant flow through a liquid cooled internal combustion engine comprising an elongated body member, an expansible and contractible thermostatic medium housed in said body member, a rod mounted in said body member for relative sliding movement therein and extending therefrom, an attachment member secured to said rod, sealing ring secured to said attachment member, an annular fluid seal operatively attached to said sealing ring for operatively sealing said thermostat within engine, a coolant flow passage extending through said sealing ring, a valve member associated with said coolant flow passage, a valve seat formed around said coolant flow passage, a spring operatively supported within said thermostat and disposed around said body member for urging said valve member into fluid sealing contact with said seat, a rod fixed to and extending from the lower end of said body member, a predetermined rate, a spring seat fixed to said rod, a support spring having operatively mounted on said seat, a lower valve element slidably mounted on said fixed rod, a lower spring having a rate less than the rate of said support spring operatively disposed between said spring seat and said lower valve element for yieldably holding said lower valve element adjacent to the outboard end of said fixed rod.

3. A double-acting, fluid-flow controlling thermostat for installation in a housing associated with a liquid cooled internal combustion engine comprising an elongated body member, a chamber provided in said body member, an expansible and contractible thermostatic medium housed in said chamber, an elongated rod mounted in said body member for relative sliding movement therein and extending therefrom to a distal end, a rod attachment member secured to the distal end of said rod, an annular sealing ring secured to said rod attachment member and extending radially therefrom, an annular fluid seal operatively attached to said sealing ring for supporting and operatively sealing said thermostat within said housing, a coolant flow passage extending through said sealing ring, a valve member associated with said coolant flow passage in said sealing ring, an internal valve seat formed around said coolant flow passage of said sealing ring, a spring operatively supported within said thermostat and disposed around said body member for urging said valve member into fluid sealing contact with said seat, a rod fixed to and extending from the lower end of said body member, a predetermined rate, a spring seat fixed to said rod, a spring support having operatively mounted on said seat, a lower valve element slidably mounted on said fixed rod, a lower spring having a rate less than the rate of said support spring operatively disposed between said spring seat and said lower valve element for yieldably holding said lower valve element adjacent to the outboard end of said fixed rod.

4. A liquid cooling system for an internal combustion engine for an automotive vehicle with an interior comprising: a heater having a coolant receiving core for heating said vehicle interior, an engine cooling radiator having a coolant receiving core for cooling said internal combustion engine, a liquid coolant flow control junction associated with said engine, said flow control junction having a heater core inlet passage and a heater core bypass passage and having an upper intake chamber for receiving coolant from said radiator and further having an outlet passage, a fluid pump for pumping coolant through said system fed directly thereto from said outlet passage of said flow control junction, an fluid exit junction in said engine, a primary coolant passage having an inlet receiving coolant from said pump and operatively extending through said engine and into said fluid exit junction, a heater circuit extending from said fluid exit junction through said core of said heater and then into said heater core inlet passage of said flow control junction, a bypass circuit in parallel said heater circuit operatively connecting said exit junction to said heater core bypass passage of said flow control junction, a radiator circuit connected to said fluid exit junction in parallel with said heater and bypass circuits operatively extending through the core of said radiator and into connection with the upper intake chamber of said flow control junction, a double acting thermostat operatively mounted in said flow control junction having a main valve element for controlling the flow through said upper chamber and thereby said radiator circuit and having a secondary valve element for controlling the flow through said bypass passage, said secondary valve element being yieldably held by a secondary spring in a blocking position to close said bypass passage while said first valve element is yieldably held in a blocking position to close said upper intake chamber during cold engine idle whereby the flow of coolant through said system is initially only through said heater core circuit to thereby optimize heating of said vehicle interior, said second valve element being subsequently displaced from said blocking position in response to the subsequent increase in engine speed and resultant increase in fluid pressure of said coolant in said system so that said bypass circuit is then opened along with said heater core circuit to increase the engine cooling capacity of the system.

5. A liquid cooling system for an internal combustion engine for an automotive vehicle having an interior comprising: a liquid coolant flow control junction associated with the engine, said flow control junction having a heater core inlet passage and a heater core bypass passage and further having an upper intake chamber for receiving coolant from a radiator and an outlet passage, a fluid pump for pumping liquid coolant through said system fed directly thereto from said outlet passage of said flow control junction, a fluid exit junction in said engine, a primary coolant passage having an inlet receiving coolant from said pump and operatively extending through said engine and into said fluid exit junction, a heater having a core for heating said vehicle, a heater core bypass circuit extending from said fluid exit junction through said core of said heater and then into said heater core inlet passage of said flow control junction, a bypass circuit in parallel said heater circuit operatively connecting said fluid exit junction to said heater core bypass passage of said flow control junction, a radiator having a core , a radiator circuit connected to said fluid exit junction in parallel with said heater and bypass circuits and operatively extending through the core of said radiator and into connection with the upper intake chamber of said flow control junction, a double acting thermostat operatively mounted in said flow control junction having a main valve element for controlling the flow through said radiator circuit and having a secondary valve element for controlling the flow through said bypass passage, said thermostat having a main valve seat for said main valve element associated with said intake chamber of said flow control junction, a secondary valve seat in said flow control junction for said secondary valve element associated with said bypass passage, said thermostat having a spring system for yieldably holding said main valve element on said main valve seat to block the flow through said radiator circuit and said secondary valve element on said secondary valve seat to block the flow through said bypass passage under cold engine idle conditions so that the coolant flow through said system is principally through said heater core circuit for optimized vehicle heating, said secondary valve element being subsequently displaceable from said second valve seat in response to increased engine speeds and increased system pressure so that said bypass circuit is opened along with said heater core circuit to increase the capacity of the system , said thermostat having an inner body with a thermostatic medium therein which expands with increases in coolant temperature, said inner body being displaced in response to an increase in coolant temperature in a direction toward said second valve seat to effect the opening of said primary valve from its seat and the seating of said second valve element on its seat so that said flow is through said radiator and heater circuits while said bypass circuit is blocked.

* * * * *